Sept. 20, 1960 P. G. PURINGTON 2,953,246

FILING CONTAINERS

Filed May 16, 1957 2 Sheets-Sheet 1

INVENTOR.
PAUL G. PURINGTON
BY
PARKER & CARTER
ATTORNEYS

INVENTOR.
PAUL G. PURINGTON
BY
PARKER & CARTER
ATTORNEYS

United States Patent Office 2,953,246

Patented Sept. 20, 1960

2,953,246

FILING CONTAINERS

Paul G. Purington, Ridgewood, N.J., assignor to The Shaw-Walker Company, Muskegon, Mich., a corporation of Michigan Filed May 16, 1957, Ser. No. 659,728

2 Claims. (Cl. 206—79)

This invention relates to improvements in filing containers especially adapted for the filing of punched recording tape of the kind used in electronic tape typewriting machines.

One of the principal problems encountered in the use of recording tape of the character above mentioned is that of filing the lengths of tape used for recording different transactions so that such tape will not be marred, and will be readily available for future reference.

A common form of recording tape now commercially in use, is made of a paper strip which is usually folded before use in recurrent laps approximately eight inches long, so that after the tape has received a punched recording, said tape can again be readily folded with laps of the same initial length to aid in filing said tape for future use or reference.

Several different methods have heretofore been employed for indexing and filing the punched tape. One method has been to place the folded lengths of punched tape flatwise in a larger filing envelope. This method of filing has several drawbacks, such as the difficulty of inserting and holding the tape properly in the envelope, and the unequal thicknesses of envelopes which have different total lengths of tape therein, or in which the tape is free to shift position in the envelope, so that the envelopes do not readily nest flatwise in a file cabinet or drawer.

The principal object of the present invention is to provide a simple and efficient form of filing containers for conventional lengths of recording tape which permits tapes of different total lengths to be refolded either in their usual initial folded lengths, or one half of such initial folded lengths, and which folds can be readily inserted in an appropriate pocket formed in the filing container along and adjacent one side thereof, so that the tape is protected from injury, and which container is also adapted to be indexed for filing in a suitable filing cabinet.

A further object of the invention is to provide a simple and efficient form of filing container of the character described which is capable of being folded from a single sheet or blank of relatively heavy paper, in such a manner that a pocket for holding the tape can be selectively formed either along the right or left side of the filing container so as to permit adjacent filing containers to be placed in a filing cabinet with their respective pockets disposed alternately at the left and right side of the filing cabinet, whereby adjacent containers may be nested in generally flatwise relation to each other, thus resulting in a considerable saving of space in the filing cabinet.

Other objects and advantages of the invention will appear from time to time as the following description proceeds.

The present application is a continuation-in-part of my previous application bearing Serial No. 644,290, filed March 6, 1957, and now abandoned.

The invention may best be understood by reference to the accompanying drawings, in which.

Figures 1, 2, 3, 4, 5, 6, 7:
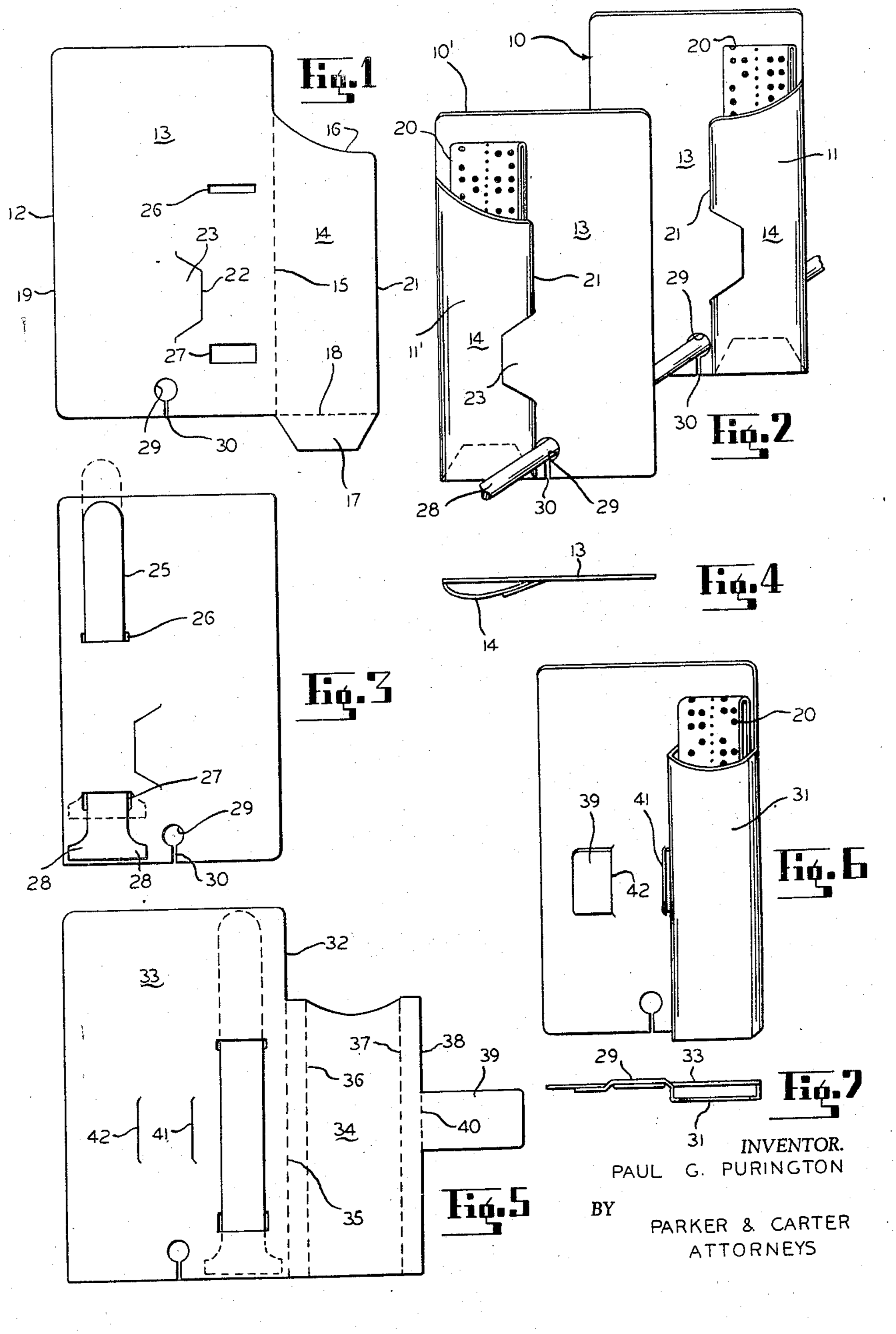
Figure 1 is a face view of a blank sheet of relatively heavy paper from which one form of filing container is formed.
Figure 2 is a perspective view showing two filing containers, both made from the form of blank shown in Figure 1, and indicating how said containers can be folded either with a right or lefthand pocket for mounting on the guide bar of a filing cabinet.
Figure 3 is a rear view of a completed filing container of the type shown in Figure 2, and showing also an "out" indicator applied thereto.
Figure 4 is a top edge view of one of the filing containers shown in Figure 2, but with the "out" indicator omitted.
Figure 5 is a face view of a blank from which a modified form of filing container is made.
Figure 6 is a perspective view of a filing container made from the blank shown in Figure 5.
Figure 7 is a top edge view of the filing container shown in Figure 6, but with the "out" indicator omitted.

Referring now to details of the embodiment of the invention shown in Figures 1 to 4, two filing containers of the index card type are shown in formed or folded condition in Figure 2, one of which containers consists of a generally rectangular card indicated at 10, having a pocket 11 along its right side, and the other card indicated at 10′ having a similar pocket 11′ along its left side, as seen in this figure.

Both of these filing cards 10 and 10′ are formed from a blank indicated generally at 12 in Figure 1, which blank is made of a sheet of relatively stiff material of the kind commonly used for indexing cards in filing cabinets. The sheet 12 of said blank has a generally rectangular main portion 13 of the size and shape adapted for use in a filing cabinet, and an integrally formed pocket portion 14 along one side of said main portion 13, and connected to the latter along a vertical, preformed crease or fold line 15. As will be seen in Figure 1, the pocket portion 14 has its upper edge 16 cut away to a level substantially below the upper edge of the main portion 13. Said pocket portion also has a depending flap 17 formed integrally therewith along its bottom edge, and connected thereto along a horizontal crease or fold line 18.

The pocket portion 14 is less than one-half the width of the total width of the main portion 13, between the left upright edge 19 of the latter and the crease line 15.

The pocket portion 14 is adapted to be folded laterally along the crease line 15 in either direction so as to be lapped over the adjacent side margin of the body portion 13 and forming therewith a pocket for the reception of a folded length of recording tape 20. As seen in Figure 2, the filing container 10 has its pocket portion 14 folded inwardly so as to form the pocket 11 along the right side of said card, while the adjacent filing container 10′ has its pocket portion 14 folded in the opposite direction to form a similar pocket 11′ along the left side of said card.

The outer edge 21 of the pocket portion is detachably secured to the body of the main portion 13 by suitable slit means, which in the form shown in Figures 1 to 4, consists of a slit 22 preformed or cut in a generally C-shape so as to form a free tab 23 which is readily capable of being pressed outwardly in one direction or the other from the main body 13 to receive the adjacent edge 21 of the pocket portion 14, depending upon whether the pocket is to be formed along the right or lefthand side of the body portion 13.

The ends of the C-shaped slit 22 both terminate in an upright plane which is spaced from the adjacent crease line 15 a distance which is slightly less than the width of the pocket portion 14 between the crease line 15 and its outer edge 21. With this arrangement the pocket portion 14 will be bowed outwardly from the body portion 13 of the container so as to facilitate the insertion of the length of recording tape 20 in the upper end of the pocket, as is indicated in Figure 4.

It will be understood that during the folding of the pocket portion 14 in one direction or the other toward the body portion 13, the tab 17 at the bottom of the pocket portion will be folded inwardly along the crease line 18 between the pocket portion and the body portion so as to form, in effect, a closure for the bottom of the pocket 11 or 11′, as the case may be.

The body portion 13 of each filing container 10 and 10′ is provided with a centrally disposed guide aperture 29 closely adjacent the bottom edge thereof, which aperture opens to the bottom edge by a narrow slot 30. Said aperture and slot are of the kind commonly employed for temporarily retaining indexing cards on a guide rod 28, such as is commonly mounted along the bottom of a filing cabinet. As will be seen in Figure 2, the aperture is disposed inwardly of the pockets 11 and 11′.

An "out" indicator or telltale strip 25 is slidably mounted in the body portion 13 to the rear of the pocket 11 or 11′ by threading said strip through two transverse slots 26 and 27 which are formed in the blank 12 in vertically spaced relation to each other, and adjacent the pocket portion 14, so as to receive the telltale strip 25 in sliding relation therethrough, as is best seen in Figure 3. Said telltale strip is made of relatively stiff material, such as heavy paper, and has lateral extension 28, 28 at its bottom end which form stops to limit the upward movement of the telltale strip relative to the lower slot 27.

The arrangement of the telltale strip 25 is such that it will be normally disposed in lowered position, as shown in full lines in Figure 3, but when the operator wishes to remove the length of tape 20 from its pocket, the operator can span the upper edge of the body portion 13 with his fingers so as to engage simultaneously the upper end of the tape 20 and the upper end of the telltale strip 25 on opposite sides of the body portion 13. Thus, as the tape 20 is withdrawn manually from the pocket, the telltale strip 25 at the rear side of the card will simultaneously be raised to a position above the top edge of the card, as shown in dotted lines in Figure 3 so as to indicate that the tape in that particular indexing card has been temporarily removed from its pocket.

Figures 5, 6 and 7 illustrate a modified form of filing container having a side pocket 31 of greater capacity than the form shown in Figures 1 to 4. In this modified form the pocket is formed from a blank indicated generally at 32. The pocket portion 34 is connected to the body portion 33 by a preformed crease line 35, but said pocket portion 34 also has a second crease line 36 parallel to and spaced from the crease line 35, and a third crease line 37 spaced from the free edge 38 of said pocket portion substantially the same distance as the space between crease lines 35 and 36. With this form of container the pocket portion also has an extended tab 39 connected to the pocket portion 34 along the crease line 40. The tab 39 is adapted to be passed through a pair of slits 41 and 42 formed in the body portion 33 so as to complete the pocket 31, in a generally rectangular form as shown in Figures 6 and 7.

Figure 8:
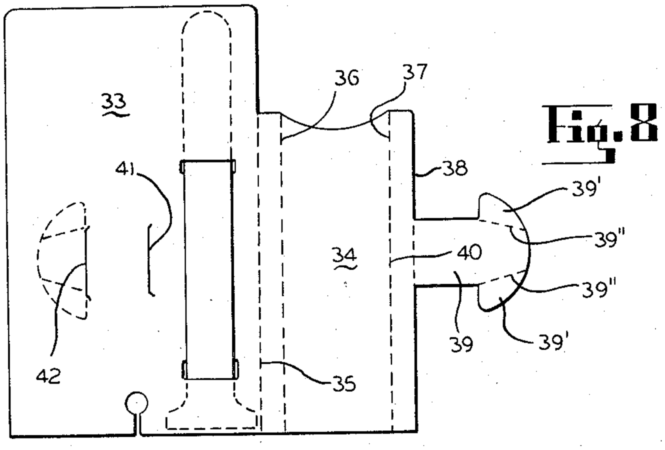
Figure 8 is a face view of a blank similar to that shown in Figure 5, but having in addition, a positive locking means for the pocket.

Figure 8 shows a blank similar to that shown in Figure 5, excepting that the tab 39 has a pair of outwardly extending locking projections 39′ at its outer end which are foldable inwardly toward each other along crease lines 39″, so that the tab can be inserted through the slits 41 and 42 with the locking projections in folded position, after which the projections may be flattened out in positive locking engagement with the adjacent edge of slit 42, to hold the tab against withdrawal from the slits. This locking arrangement is especially advantageous in instances where an especially long and bulky length of recording tape is to be contained in the side pocket 31.

Figure 9:
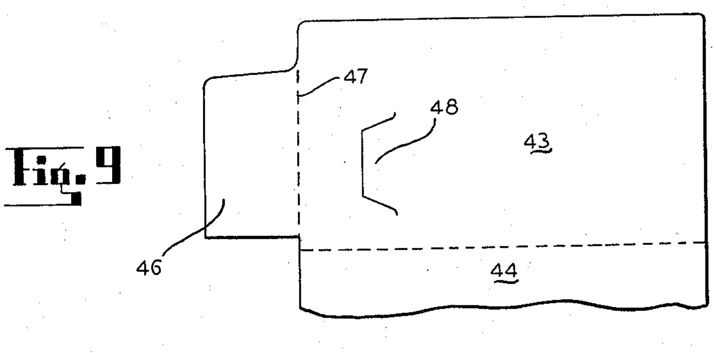
Figure 9 is a face view of a blank from which another modified form of filing container is formed in which the container consists of a relatively wide, correspondence type folder with the tape receiving pocket formed along one side thereof.

Figure 9 shows another modified form of filing container in which the body portion 43 is considerably wider than the form of filing container shown in the previous figures, and said body portion also has overlapping cover 44 so that said filing container is adapted to receive a length of recording tape 20 in a pocket 45 along one edge of the body portion 43, to also receive between the body portion 43 and the overlapped cover 44 any suitable written data or correspondence relating to the subject matter of the recording strip 20. In this form of filing container the pocket is formed as before, by folding a pocket portion 46 along a crease line 47 and engaging it beneath a tongue 48 formed by slitting the body portion 43 of the container in substantially the same manner as described in connection with the form of interlocking slit means 23, 23 employed in the form of filing container shown in Figures 1 to 4, inclusive.

Figures 10, 11:
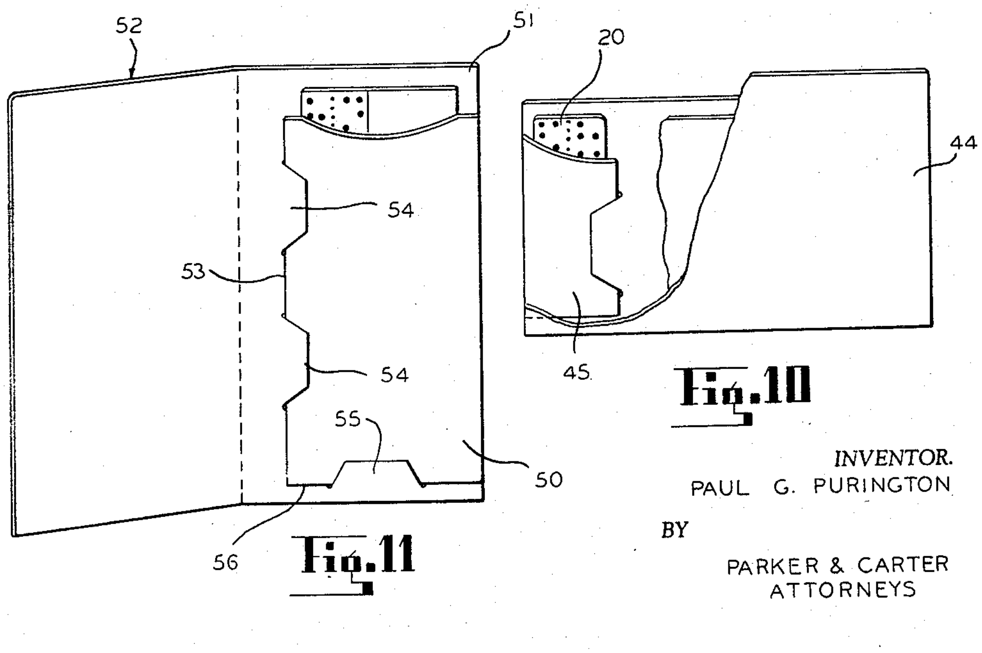
Figure 10 is a perspective view of the assembled filing container made from the blank shown in Figure 9, with parts broken away to show the pocket.
Figure 11 is a view showing still another form of filing container especially adapted for receiving a much wider form of recording tape, which is punched along one edge thereof.

Figure 11 shows still another form of filing container especially adapted for receiving recording tape of the type in which the tape is considerably wider than the form of tape indicated at 20 in the preceding figures, and in which the punched portion of the tape is formed along one edge of said tape. As will be seen in Figure 11, a pocket is formed by a pocket portion 50 integral with the body portion 51 of a filing folder indicated generally at 52. The free edge 53 of the pocket portion 50 is secured beneath upturned flaps 54, 54 formed in said body portion 51. The lower end of the pocket may also be closed by an additional upturned flap 55 engaging a bottom edge 56 of the pocket portion 50.

Although I have shown and described certain embodiments of my invention, it will be understood that various changes and modifications may be made without departing from the spirit and scope of the invention as defined by the appended claims.

I claim:

1. In a filing container for recording tape or the like, a generally rectangular sheet of relatively stiff material of a size and shape adapted for use as an indexed file in a filing cabinet, said sheet having a pocket along one margin open at its upper end below the top edge of said sheet for holding a length of tape in upright, removable position, and a vertically elongated indicating strip mounted on said sheet for limited slidable movement rearwardly of said pocket and with the upper end of said strip normally disposed to the rear face of said sheet and below the top edge of the latter, in position to be manually engaged simultaneously with the withdrawal of a length of tape from the pocket in the front face of said sheet, so that the upper end of said indicating strip may be automatically raised to a predetermined position above the upper edge of said sheet during the manual withdrawal of a strip of tape from said pocket.

2. The structure of claim 1, wherein the sheet has a pair of vertically spaced transverse slots therein for receiving the indicator strip in threaded slidable engagement, and said indicator strip has stop means extending laterally therefrom and engageable with one of said slots for limiting the upward movement of said strip relative to said sheet.

References Cited in the file of this patent

UNITED STATES PATENTS

| | | |
|---|---|---|
| 2,039,752 | Thomas | May 5, 1936 |
| 2,134,846 | Soybel et al. | Nov. 1, 1938 |
| 2,152,304 | Dawson | Mar. 28, 1939 |
| 2,401,615 | Chittum | June 4, 1946 |

FOREIGN PATENTS

| | | |
|---|---|---|
| 456,438 | Great Britain | 1936 |
| 1,102,160 | France | May 4, 1955 |